(12) United States Patent
Hochhausen et al.

(10) Patent No.: US 7,518,334 B2
(45) Date of Patent: Apr. 14, 2009

(54) METHOD AND DEVICE FOR CONTROLLING A BRUSHLESS DC MOTOR

(75) Inventors: Ralf Hochhausen, Ingolstadt (DE); Jörg Seyfarth, Regensburg (DE); Pietro De Filippis, Milan (IT)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 57 days.

(21) Appl. No.: 10/582,505

(22) PCT Filed: Dec. 9, 2004

(86) PCT No.: PCT/EP2004/053374

§ 371 (c)(1),
(2), (4) Date: Jan. 12, 2007

(87) PCT Pub. No.: WO2005/060085

PCT Pub. Date: Jun. 30, 2005

(65) Prior Publication Data

US 2007/0222402 A1    Sep. 27, 2007

(30) Foreign Application Priority Data

Dec. 9, 2003   (DE) .............................. 103 57 501

(51) Int. Cl.
*H02P 23/00* (2006.01)
(52) U.S. Cl. .................. 318/809; 318/811; 318/599
(58) Field of Classification Search ................ None
See application file for complete search history.

(56) References Cited

U.S. PATENT DOCUMENTS 5,872,435 A    2/1999  Bolte et al.
5,936,386 A *  8/1999  Heglund ....................... 322/94
6,002,234 A    12/1999 Ohm et al.
2003/0001538 A1*  1/2003  Atmur ........................ 318/811
2003/0164692 A1    9/2003  Grand et al.
2005/0081647 A1    4/2005  Yin Ho

FOREIGN PATENT DOCUMENTS

EP     0 748 038 A2    12/1996
WO    WO 03/043172 A1    5/2003

* cited by examiner

*Primary Examiner*—Walter Benson
*Assistant Examiner*—Renata McCloud
(74) *Attorney, Agent, or Firm*—Laurence A. Greenberg; Werner H. Stemer; Ralph E. Locher

(57) ABSTRACT

A method and a control device for a brushless DC motor, which has an AC/DC inverter supplied by an intermediate direct voltage circuit for feeding the DC motor, a pattern generator for controlling switches of the AC/DC inverter having a variable frequency and phase periodical switch signal pattern and an input for a signal representative of the present phase position of the rotor of the DC motor. The pattern generator detects an average current strength released by the AC/DC inverter and adjusts a phase offset between the phase position of the rotor and the switch signal pattern in accordance with the detected average current strength and the speed of the motor. The pattern generator controls the motor by adjusting a desired speed of the motor by variation of an average terminal voltage of the motor; detecting the average power requirement of the motor and the lead angle between the rotor of the motor and the driving magnetic field; approximating the lead angle to a desired value given as a function of the speed and the average power requirement.

10 Claims, 3 Drawing Sheets

METHOD AND DEVICE FOR CONTROLLING A BRUSHLESS DC MOTOR

BACKGROUND OF THE INVENTION

Field of the Invention

The present invention relates to a device and a method for controlling a brushless DC motor.

A device of this type conventionally comprises an AC/DC inverter supplied by an intermediate direct voltage circuit for feeding stator windings of the DC motor and a pattern generator for controlling switches of the AC/DC inverter having a periodic switching signal pattern such that the stator windings in the motor generate a rotating magnetic field in the permanent magnets of the rotor attempt to align themselves. The torque which such a motor is capable of delivering depends on the angle between the permanent magnetic field of the rotor and the magnetic field of the stator windings in advance thereof. For optimal efficiency of the motor, the currents fed by the AC/DC inverter into the stator windings and the electromotive force (emf) induced therein by the turning of the rotor should be in phase. This means that the control voltage of the emf of the motor is more or less in advance. The lead angle at which the motor achieves the optimal efficient depends on the load of the motor, i.e., the torque exerted thereby and the speed. In order to operate the motor at the highest possible efficiency, load and speed are therefore normally measured and a lead angle known as optimal for a given combination of values of the load and speed (hereinafter calls the operating point of the motor) is set. The load is known to be proportional to the peak current of the individual stator windings which is why, to determine the load, the peak current is measured using an electronic peak value detector and the load is calculated therefrom.

However, it is especially difficult to detect the peak current in cases of pulse-width-modulated control of the AC/DC inverter and low motor loads since, as a result of the small pulse widths, fast and therefore expensive comparators must be used in a peak value rectifier so that this can exactly reproduce the peak current at low pulse duty factors.

SUMMARY OF THE INVENTION

It is the object of the present invention to provide a device and a method for controlling a brushless DC motor which allows the DC motor to be operated with high efficiency using simple and inexpensive means.

The object is solved by a method having the features of claim 1 or a device having the features of claim 6.

In contrast to the peak current strength, the average current strength can be detected exactly without any difficulties even at low loads but is not in any single-valued relationship to the motor load because the efficiency, that is the ratio of the product of load and speed to the consumed electrical power, depends on the lead angle. Nevertheless, this can surprisingly be used in an iterative method to adjust the operating point of a brushless DC motor.

The desired value of the lead angle is preferably that value of the lead angle which maximises the efficiency of the motor for the allocated values of the speed and average power requirement. If the lead angle is approximated to this desired value, the resulting improvement in the efficiency of the motor for the same average power requirement of the motor results in an increase in the mechanical power, i.e. in an increase in the speed for the same load. By returning the speed to its desired value again by varying the average terminal voltage of the motor, the optimal operating point of the motor for this desired speed is reached in the course of several iterations.

The desired value of the lead angle is preferably determined using a characteristic map which specifies the lead angle with the highest efficiency for a plurality of operating points of the motor each defined by a speed and an average power requirement. Such a characteristic map generally specific for the design of the motor is preferably first determined empirically and can be provided for the control according to the invention in the form of a memory module which gives the respectively optimal lead angle for the various operating points.

Since such a characteristic map can only comprise a limited number of discrete operating points, in general the load angle (lead angle) for an actual speed and average power requirement is obtained from the characteristic map by interpolation.

In order to influence the average power requirement of the motor, the average terminal voltage applied thereto is preferably varied by pulse width modulation.

A control device suitable for carrying out the method comprises an AC/DC inverter for feeding the DC motor, a pattern generator for controlling the switches of the AC/DC inverter having a periodic switching signal pattern of variable frequency and phase, which has an input for a representative signal for an instantaneous phase position of the rotor of the DC motor, wherein the pattern generator has means for detecting the average current strength delivered by the AC/DC inverter and means for adjusting a phase offset between the phase position of the rotor and the switching signal pattern depending on the detected average current strength and the speed of the motor.

In order to counteract any drift of the motor speed in the event of a correction to the phase offset, means are preferably provided for regulating an average terminal voltage of the motor using a desired speed.

The means for adjusting the phase offset preferably comprise a phase-locked loop (PLL) circuit which can be locked to the frequency of the input signal representative of the phase position of the rotor. For adjusting the phase offset control means are provided for predefining a target phase offset depending on the detected power and speed of the motor. These control means preferably include the afore-mentioned storage device for the characteristic map, which specifies for a plurality of operating points, respectively one target phase offset which minimises the efficiency of the motor.

The speed of the motor can be detected using a speed sensor coupled to the motor; preferably however the means for adjusting the phase offset comprise means for deriving the speed from the input signal representative for the phase position of the rotor.

The means for adjusting the phase offset can be divided into a desired value transmitter which specifies a desired value of the phase offset for the actual operating point and generates a representative signal for this desired value and a regulator for matching the actual phase offset to this desired value using the representative signal. At the same time, the representative signal can have values above and below a representative value for a phase offset of 0° so that standard processing of signals representative for positive and negative phase offsets is possible in the regulator.

Further features and advantages of the invention are obtained from the following description of exemplary embodiments with reference to the appended figures. In the figures:

DESCRIPTION OF THE PREFERRED EMBODIMENTS

Figure 1:
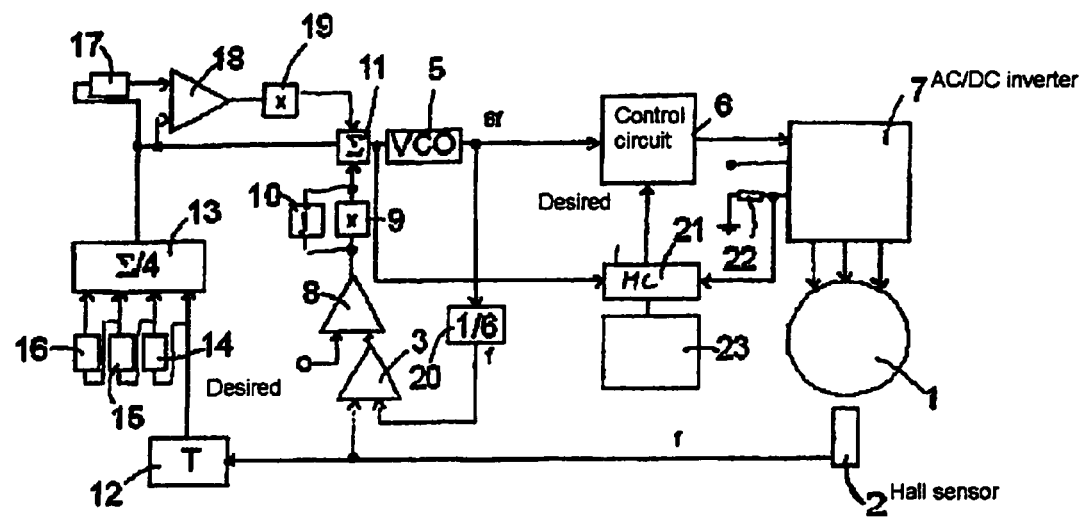
FIG. 1 is a block diagram of the control device according to the invention and a brushless DC motor controlled thereby.
Figure 2:
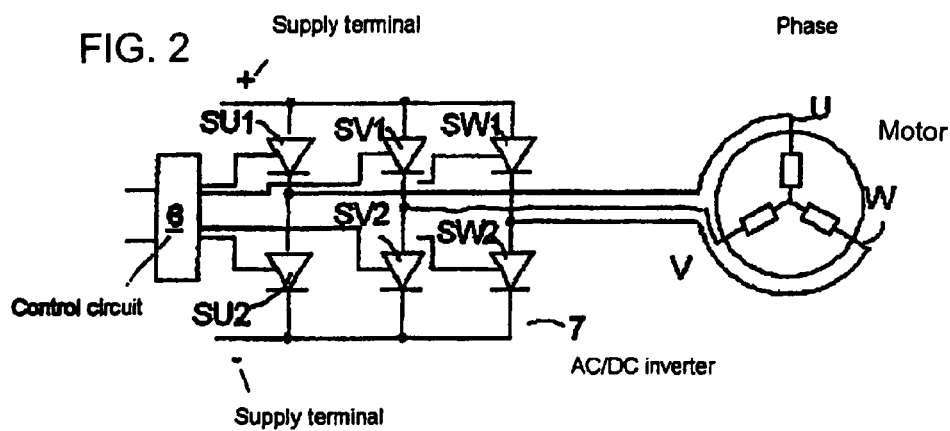
FIG. 2 is a schematic circuit diagram of an AC/DC inverter used in the control device in FIG. 1.

In the block diagram in FIG. 1, 1 designates a brushless DC motor whose rotor has n=4 pairs of poles. The DC motor 1 i supplied by an AC/DC inverter 7 which is shown in greater detail in FIG. 2. This comprises six switches SU1, SV1, SW1, SUZ2, SV2, SW2 of which the switches SU2, SV1, SW1 are arranged between a positive supply terminal (+) and a phase U, V or W of the motor 1 and the switches SU2, SV2, SW2 are each arranged between one of these three phases and a negative supply terminal (−). The switches can be IGBTs known per se with a suppressor diode connected in parallel.

The switches of the AC/DC inverter are controlled by a control circuit 6 which applies six different switching states to the switches in a cyclically recurrent manner, these being explained in further detail with reference to FIG. 3.

A Hall sensor 2 is located in the immediate vicinity of the rotor of the motor 1 to detect the field of each individual pole of the rotor which passes thereby. The Hall sensor 2 delivers an output signal which has an ascending flank in each case when passing a first type of pole and a descending flank when passing the other type of pole. The frequency f of the output signal of the Hall sensor 2 is thus n times the rotational frequency of the motor 1.

The output signal of the Hall sensor 2 is applied to a first input of a phase comparator 3 whose second input is supplied with a comparison signal whose formation will be explained. The phase comparator 3 can be formed, for example, by an electronic counter which begins to count pulses of a clock signal whenever a descending signal flank arrives from the Hall sensor, the frequency of this signal being a multiple of the frequency f, until a descending signal flank is received at the second signal input and outputs the counter result as the measured value for a phase difference between the two signals.

The output signal of the phase comparator 3 forms the non-inverted input signal of a differential amplifier 8 to whose inverting input is applied a representative desired-value signal provided by a microcontroller 21 for a desired phase offset between the pattern of the switching states and the output signal of the Hall sensor. The level of this desired-value signal is linearly relate to the desired lead angle and can have values in a range whose limits should each correspond to desired lead angles smaller or larger than 0°. The lower limit preferably corresponds to a desired lead angle of $-2\pi/3$ and the upper limit corresponds to a lead angle of $+4\pi/3$ so values of the desired lead angle around 0° can be adjusted by continuously varying the level of the desired value signal.

Connected to the output of the differential amplifier 8 is a proportional/integral controller consisting of a weighting part 9 which multiplies the output signal of the difference amplifier 8 with a pre-determined weighting factor, and an integrator 10 for integrating the output signal of the differential amplifier. The additively superposed output signals from the weighting part 9 and integrator 10 are fed to a voltage-controlled oscillator 5 as a frequency-controlled signal together with further contributions added in an adder 11.

In addition to the phase comparator 3, a period measuring circuit 12 is connected to the output of the Hall sensor 2, which circuit measures the time between two successive descending flanks of the signal from the Hall sensor 2 and delivers this as an output signal to an average value circuit 13 and a first shift register 14. Connected to the output of the first shift register is an input of a second shift register 15 and a second input of the average value circuit 13; connected to the output of the second shift register is a third shift register 16 and a third input of the average value circuit 13, and at the output of the third shift register a fourth input of the average value circuit 13. With each new period measured value supplied by the measuring circuit 12, this triggers the shift registers 14, 15, 16 so that these take over and output the measured value respectively applied to their input. Thus, the four most recent measured values of period durations of the Hall sensor signal are always applied to the inputs of the average value circuit 13. The average value circuit 13 delivers the average of these measured values at its output. (In general, if the number of pairs of rotors is n, n inputs and n−1 shift registers are always provided so that averaging is performed over the number of periods of the Hall sensor signal which corresponds to a complete revolution of the rotor). Cyclic fluctuations in the period duration which can result from non-uniformities in the arrangement of the four pairs of poles of the rotor are thus eliminated in the output signal of the average value circuit 13. This output signal makes a substantial contribution to the input voltage of the voltage-controlled oscillator 5. Thus, after two passages of the rotor through the reference position, an input voltage is applied to the oscillator 5 which is not far removed from the input voltage which would be established in the steady-state mode and the frequency of the oscillator 5 can rapidly lock to that of the rotor.

The output of the average value circuit 13 is further connected to a difference circuit 18, on the one hand directly and on the other hand via a fourth shift register 17 which is triggered in a similar manner to the shift registers 14 to 16 so that the difference circuit 18 delivers the difference between two successive averaged periods of the Hall sensor signal as an output signal. The output signal of the difference circuit 18 thus corresponds to the average variation of the period duration and indicates an accelerated or slowed running of the motor 1. This accelerated or slowed running is taken into account by adding the output signal of the difference circuit 18, weighted by a factor of 0.5 in a weighting part 19, to the afore-mentioned contributions to the input signal of the oscillator 5 in the adder. Thus, the oscillation of the oscillator 5 already allows for a variation of the period duration which is to be expected in extrapolation of the past but has not yet been measured.

The voltage-controlled oscillator 5 delivers an oscillation whose frequency in the steady-state mode is six times as high as that of the Hall sensor signal. A ⅙ count-down oscillator 20 produces the comparison signal supplied to the phase comparator 3 herefrom. The control circuit 6 receives the output signal with the frequency 6f from the voltage-controlled oscillator 5 and derives the control signals for the switches of the AC/DC inverter 7 from this. In the time diagram in FIG. 3 the oscillation of the voltage-controlled oscillator 5 is designated by VCO. The control circuit 6 responds to its ascending flank by changing from one of six cyclically successively produced switching states a, b, c, d, e, f to the next.

Figure 3:
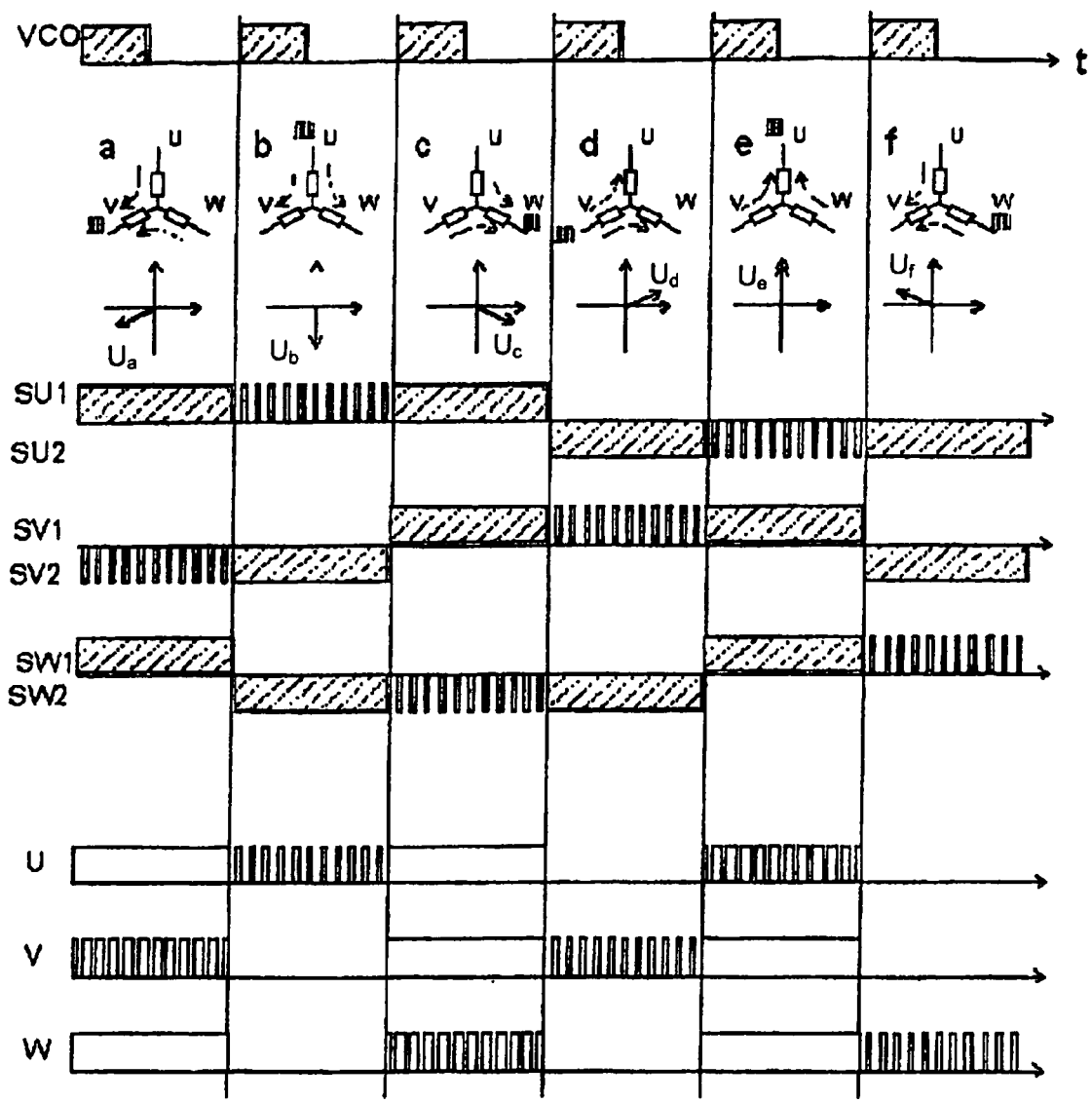
FIG. 3 shows the time sequence of the switching states applied cyclically repeatedly to the motor.

For each of the switching states a to f FIG. 3 shows the state of the switch of the AC/DC inverter 7 and the voltages resulting therefrom at the phases U, V, W of the electric motor 1. In state a the switches SU1, SW1 are closed. The switches SU2, SW2, SV1 are open and the switch SV2 is opened and closed in pulsed mode, the pulse duty factor being specified by a power control signal which the control circuit 6 receives from the microcontroller 21. According to the pulse duty factor of the switch SV2, current flows through the phases U, V or W, v of the motor and the resulting magnetic fields are superposed to form a space vector $u_a$. In the following switching state b, the switches SV2, SW2 are open, SU2, SV1, SW1 are closed and SU1 is pulse-width-modulated with a pulse duty factor specified by the power control signal of the microcontroller 21; accordingly current flows through the phases U, V and U, W and results in a space vector $U_b$ which is turned through 60° in the anticlockwise direction compared with $u_a$. The closed, open, pulse-width-modulated, states of the switches for states c, d, e, f and the resulting current distributions and space vectors can be read off from FIG. 3 and do not need to be explained here in detail. It is important that six periods of the VCO signal produce a rotation of the space vector through 360°.

Naturally, the states of the AC/DC inverter 7 controlled by the control circuit 6 can be different from those shown in FIG. 3, in particular, although less preferred, a state pattern can be considered where each phase U, V, W of the motor 1 is kept current-free for the length of respectively one state by opening both allocated switches, then connected to the positive supply voltage for the length of two states, then kept current-free for the length of one state again and finally connected to the negative supply terminal for the length of two states and the three phases are phase-shifted with respect to one another by respectively two states.

The efficiency of the electric motor 1 depends on the lead angle between the magnetic field generated by the windings of its state and the rotor rotating in this field. For each operating point characterised by a speed and a torque or in an equivalent manner, by a speed and a mechanical power, there is an optimal lead angle which can be determined empirically, for example, for a specific motor model. Since, as has already been explained, the determination of the peak current from which the load (the torque) could be uniquely calculated, is complex, a different approach is selected in the control device according to the invention. In this case, the microcontroller 21 detects the electrical power requirement of the motor 1, for example, as shown in FIG. 1, using a series resistor 22 disposed in the intermediate circuit of the AC/DC inverter 7 to which a voltage proportional to the current strength of the intermediate circuit is applied. If the intermediate-circuit voltage is assumed to be constant, measurement of this current strength is sufficient to determine the electrical power requirement; on the other hand, it can be provided that the microcontroller 21 also measures the intermediate-circuit voltage and calculates the power requirement as a product of intermediate circuit voltage and current strength. The speed of the motor 1 is determined by the micro-controller 21 from the output signal of the adder 11 which is proportional hereto.

A characteristic map which gives the optimal lead angle for a set of operating points is stored in a memory module 23 connected to the microcontroller 21. This set of operating points is selected in a manner known per se so that for all practically relevant operating points of the motor 1 not contained therein, the respectively optimal lead angle can be calculated by interpolation in the microcontroller 21.

Figure 4:
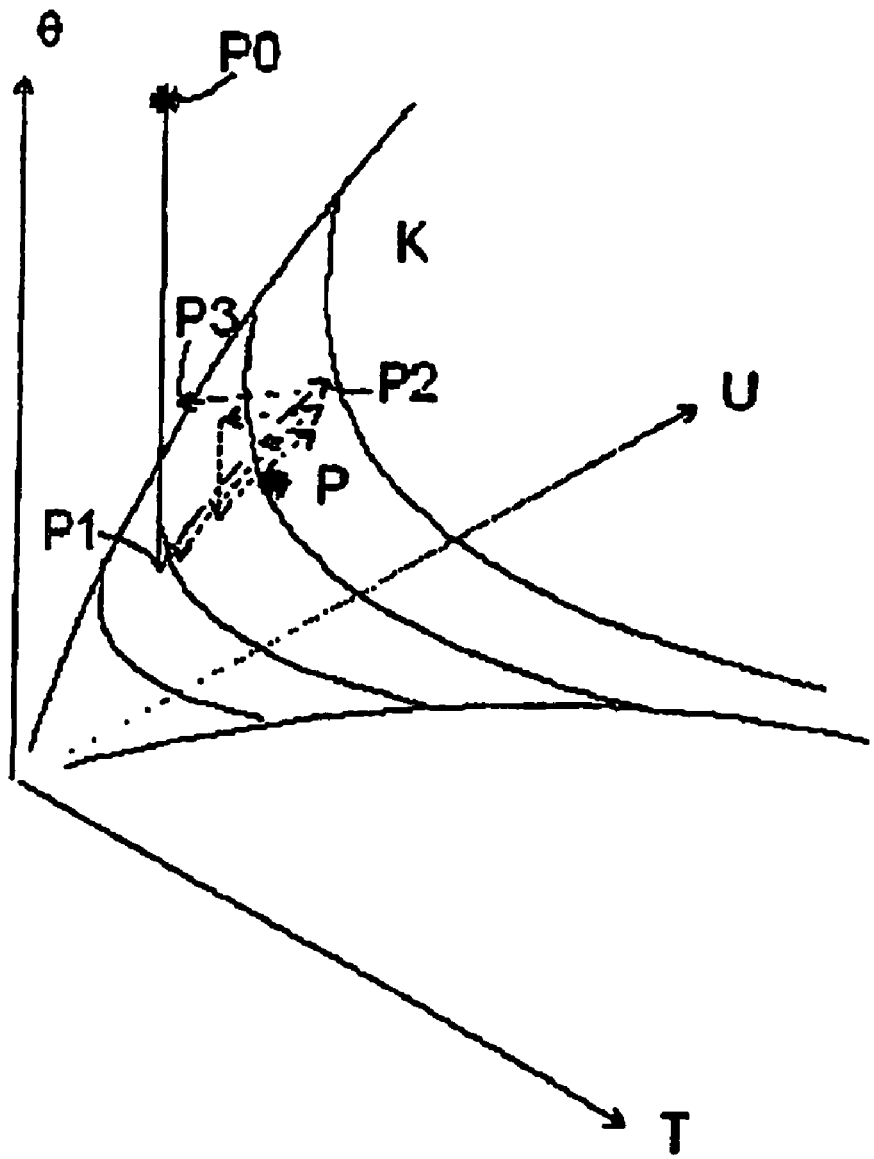
FIG. 4 is a diagram which illustrates the migration of the operating point of a brushless DC motor controlled using the device according to the invention.

The operating mode of the microcontroller is explained with reference to FIG. 4. The figure is a three-dimensional diagram in which a curved surface K represents the relationship between speed U, mechanical power P and optimal lead angle θ stored in the characteristic map. A point P0 in this diagram represents an arbitrary starting point of the regulating method executed by the microcontroller 21. This is characterised by a value of the speed deduced by the microcontroller from the output signal of the adder 11, an (arbitrary) lead angle θ which the microcontroller 21 applies as the desired value to the differential amplifier 8, and a mechanical power P of the motor which the microcontroller 21 estimates from the consumed electrical power by multiplying with a known efficiency η of the motor. The efficiency η is that efficiency achieved by the motor at the given speed with an optimally adjusted lead angle θ. At the point P0 the lead angle is higher than the optimal value so that the mechanical power of the motor is actually lower than the value estimated by the microcontroller 21. However, this is not disturbing for the purposes of the method. Using the values of the speed and mechanical power thus obtained the microcontroller 21 determines the optimal lead angle corresponding to the operating point using the characteristic map K (where it imputes the estimated value of the mechanical power to be the true value) and predefines the lead angle thus determined as the desired value to the differential amplifier 8. Thus, the point P1 is in the diagram in FIG. 4 is reached.

Since the mechanical power of the motor assumed by the microcontroller is based on an approximation, in reality no point is reached on the surface K but the efficiency of the motor 1 is improved by correcting the lead angle. Consequently, the speed and/or mechanical power of the motor increase and the estimated operating point migrates towards P2. The microcontroller 21 now recognises that the desired speed is exceeded and the control circuit 6 reduces the pulse duty factor preset by the afore-mentioned power control signal. If the lead angle remains the same, the speed and/or power decrease again and the point P3 is reached. At this point, as previously at point P0, the optimal lead angle is estimated from the characteristic map and set for the assumed operating point. The procedure is repeated iteratively until it finally converges to the point P where the lead angle θ is optimally adjusted and the efficiency of the motor is actually equal to θ.

We claim:

1. A method for controlling a brushless DC motor, comprising the steps of:
    a) adjusting the speed of the motor to a value of the setpoint speed by varying an average terminal voltage of the motor, and thereby determining the average terminal voltage of the motor by pulse width modulation;
    b) detecting an average power requirement of the motor and a lead angle between a rotor of the motor and a driving magnetic field; and
    c) approximating the lead angle to a predetermined desired value as a function of the speed and the average power requirement;
    d) iteratively repeating steps a)-c) until the operating point of the motor is adjusted to an optimal operating point for a predetermined setpoint speed.

2. The method according to claim 1, wherein the desired value is a value of the lead angle that maximizes an efficiency of the motor for respectively associated values of the speed and average power requirement.

3. The method according to claim 2, which comprises determining the desired value of the lead angle from a characteristic map specifying the lead angle with a highest efficiency for a plurality of operating points of the motor each defined with reference to a speed and an average power requirement.

4. The method according to claim 3, which comprises obtaining the desired value of the lead angle for the actual speed and the average power requirement from the characteristic map by interpolation.

5. A control device for a brushless DC motor with a rotor, comprising:

- an AC/DC converter supplied by an intermediate direct voltage circuit for feeding the DC motor, said AC/DC converter having a plurality of switches;
- a pattern generator for controlling said switches of said AC/DC converter, said pattern generator having a periodic switching signal pattern of variable frequency and phase, and having an input for a representative signal for an instantaneous phase position of the rotor of the DC motor;
- said pattern generator including a device for detecting an average current strength delivered by said AC/DC inverter and a device for adjusting a lead angle between the phase position of the rotor and the switching signal pattern depending on a detected average current strength and a speed of the motor; and
- a device for regulating an average terminal voltage of the motor with reference to a setpoint speed, said control device being configured to:
  - (a) adjust the speed of the motor to a value of the setpoint speed by varying an average terminal voltage of the motor, and thereby determining the average terminal voltage of the motor by pulse width modulation;
  - (b) detect an average power requirement of the motor and a lead angle between a rotor of the motor and a driving magnetic field;
  - (c) approximate the lead angle to a predetermined desired value as a function of the speed and the average power requirement; and
  - (d) iteratively repeat steps (a)-(c) for adjusting an operating point of the motor for a predetermined setpoint speed.

6. The control device according to claim 5, wherein said device for adjusting the lead angle includes a PLL circuit configured to be lockable to a frequency of the input signal representative for the phase position of the rotor.

7. The control device according to claim 5, wherein said device for adjusting the lead angle includes control means for predefining a desired value of the lead angle depending on the detected power and speed of the motor.

8. The control device according to claim 7, wherein said control means includes a memory device for storing a characteristic map of the motor, the map, specifying combinations of motor speed and power with reference to the desired value of the lead angle that minimizes the power requirement of the motor.

9. The control device according to claim 5, wherein said device for adjusting the lead angle comprises means for deriving the speed from an input signal representative for the phase position of the rotor.

10. The control device according to claim 5, wherein said device for adjusting the lead angle comprises a desired value transmitter for generating a representative signal for a desired value of the lead angle and a regulator for matching an actual lead angle to the desired value using the representative signal, wherein the representative signal may have values above and below a representative value for a lead angle of 0°.

\* \* \* \* \*